(12) United States Patent
Kozinsky et al.

(10) Patent No.: US 8,723,342 B2
(45) Date of Patent: May 13, 2014

(54) WEARABLE GENERATOR DEVICE

(75) Inventors: Inna Kozinsky, Mountain View, CA (US); Susan Luschas, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 290 days.

(21) Appl. No.: 12/783,366

(22) Filed: May 19, 2010

(65) Prior Publication Data
US 2011/0285146 A1   Nov. 24, 2011

(51) Int. Cl.
*F03G 7/08* (2006.01)

(52) U.S. Cl.
USPC .......................................... 290/1 R

(58) Field of Classification Search
CPC ........... H02B 1/01; H02K 3/04; H02K 35/02; F03G 7/08
USPC .................... 290/1 R; 368/203, 204
See application file for complete search history.

(56) References Cited

U.S. PATENT DOCUMENTS

| | | | | |
|---|---|---|---|---|
| 3,231,749 A * | 1/1966 | Hinck, III | | 290/53 |
| 4,110,630 A | 8/1978 | Hendel | | |
| 4,423,334 A * | 12/1983 | Jacobi et al. | | 290/53 |
| 4,492,875 A * | 1/1985 | Rowe | | 290/53 |
| 4,568,301 A * | 2/1986 | Hawley, Jr. | | 446/134 |
| 5,941,692 A * | 8/1999 | Olney et al. | | 417/233 |
| 6,756,695 B2 * | 6/2004 | Hibbs et al. | | 290/42 |
| 6,809,427 B2 * | 10/2004 | Cheung et al. | | 290/1 R |
| 6,879,076 B2 | 4/2005 | Long | | |
| 6,921,983 B2 * | 7/2005 | Diamontopoulos | | 290/1 R |
| 6,982,497 B2 | 1/2006 | Rome | | |
| 7,148,583 B1 * | 12/2006 | Shau et al. | | 290/1 R |
| 7,345,407 B2 | 3/2008 | Tanner | | |
| 7,436,082 B2 * | 10/2008 | Ruse et al. | | 290/42 |
| 7,538,445 B2 * | 5/2009 | Kornbluh et al. | | 290/53 |
| 7,989,975 B2 * | 8/2011 | Clement et al. | | 290/53 |
| 2004/0104623 A1 * | 6/2004 | Nakano et al. | | 310/12 |
| 2004/0155467 A1 * | 8/2004 | Cheung et al. | | 290/1 R |
| 2008/0174120 A1 * | 7/2008 | Gardner et al. | | 290/1 C |
| 2009/0256443 A1 | 10/2009 | Turner | | |

OTHER PUBLICATIONS

Farley et al., Biomechanics of Walking and Running: Center of Mass Movements to Muscle Action, Exercise and Sport Sciences Review, 1998, pp. 253-285, vol. 26, Lippincott Williams & Wilkins, U.S.
Lee et al., Determinants of the Center of Mass Trajectory in Human Walking and Running, The Journal of Experimental Biology, 1998, pp. 2935-2944, vol. 201, The Company of Biologists Limited 1998, Great Britain.

* cited by examiner

*Primary Examiner* — Tulsidas C Patel
*Assistant Examiner* — Viet Nguyen
(74) *Attorney, Agent, or Firm* — Maginot, Moore & Beck

(57) ABSTRACT

A wearable generator system in one embodiment includes a plurality of coils, each of the plurality of coils extending within a respective one of a plurality of planes, a magnet for generating a magnetic field, and a support attached to a support anchor point and to the magnet, and suspending the magnet at a position whereat the magnet is not frictionally engaged with a fixed surface, the support having a length selected such that the magnetic field is movable across each of the plurality of coils.

9 Claims, 4 Drawing Sheets

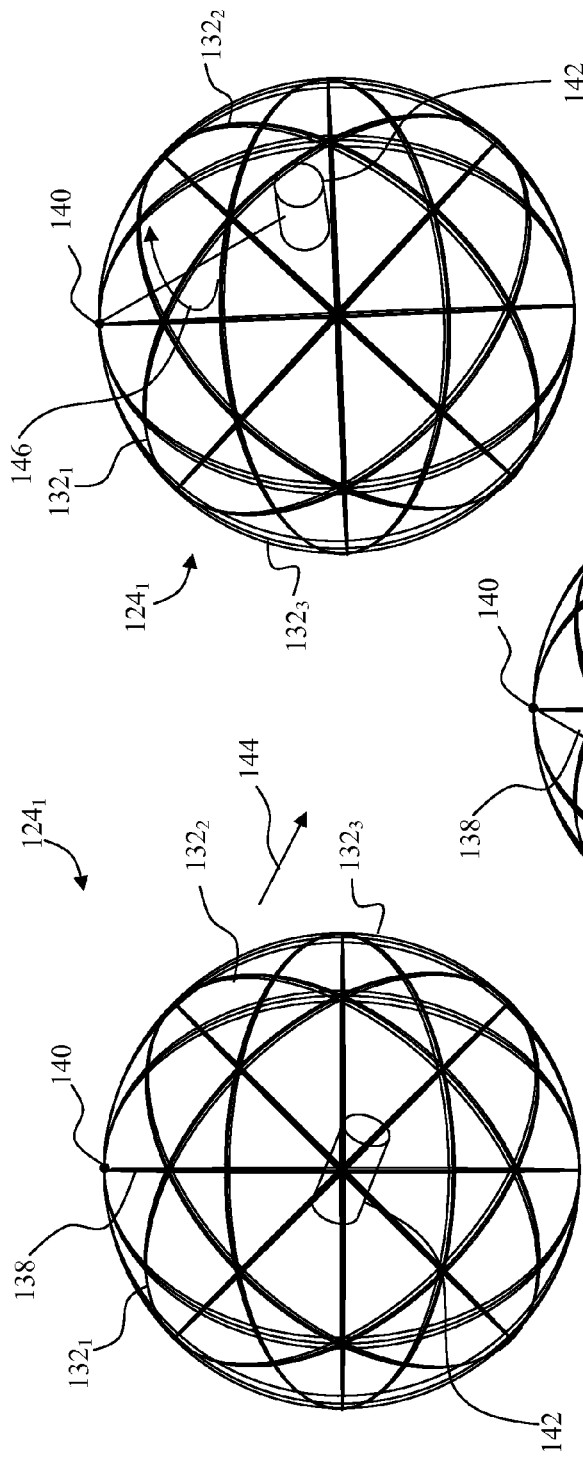
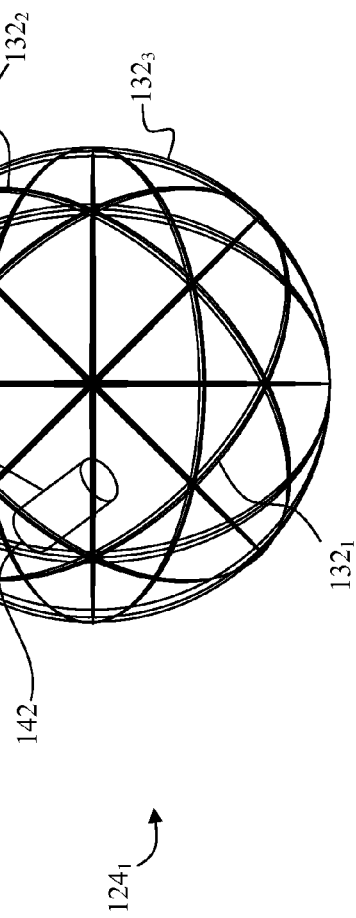
FIG. 3
FIG. 4
FIG. 5

WEARABLE GENERATOR DEVICE

FIELD

This invention relates to wearable power generating devices.

BACKGROUND

The popularity of wearable and/or portable electronic devices has created a substantial market for such devices. Portable electronic devices include personal electronic devices, such as smart phone, cell phones, MP3 players, and Bluetooth, etc. One limitation of such devices is the amount of energy that can be conveniently stored in the devices. Accordingly, substantial resources have been devoted to maximizing the energy storage capacity for both a given volume and a given weight. Nonetheless, portable electronic devices are still limited by the amount of energy that can be stored in the devices.

Consequently, portable electronic devices require frequent recharging. Moreover, as the device ages, the capacity of the energy storage system of the device deteriorates, necessitating more frequent charging.

Recharging a portable electronic device is generally a simple matter. A number of convenience enhancing devices have been developed allowing portable electronic devices to be rapidly charged and to be charged using a variety of power sources such as 12 v power systems commonly found in motorized vehicles. Additionally, backup batteries are commonly made available so that a fresh battery can be used to replace a depleted battery.

Even with all of the advances in powering portable electronic devices, however, providing power can be a challenge. For example, many people enjoy using portable electronic devices while hiking. The availability of power sources for recharging portable electronic devices is very limited, however, along hiking trails. Even when charging sources are available, however, recharging the power system of the portable electronic device requires the portable electronic device or the power source to remain in a specific location. Even for quick charging systems, the delay in activities is an undesired consequence.

In response to the foregoing limitations, the possibility of scavenging human power and either using it directly, or storing it for later use, to power portable electronic devices has been explored. Power harvesting generators which use human motion offer an attractive grid-free and portable energy source that can be used to power and recharge wearable and personal electronics. These generators harvest energy from everyday human motion, such as walking, running, standing up, and sitting down and use the harvested energy to charge the battery (or other storage reservoir) of a personal electronic device or even power the electronic devices directly.

In general, power harvesting devices are mechanical-to-electrical energy converters that usually consist of a mass-spring system coupled to a frame which is displaced by outside vibrations, shocks, or other motion. The mass-spring system acts as a damper for the motion of the frame, thereby acquiring kinetic energy. Transduction of mechanical to electrical energy by mass-spring system can be electromagnetic (magnet moving relative to a coil), electrostatic (charged objects moving past each other), or piezoelectric (strain in a bending element produces output voltage).

Transduction of human motion for powering wearable or portable electronics presents particular challenges. By way of example, frequencies of ordinary human motion (e.g. walking) are typically very low (~1-2 Hz), the amplitudes of the movements are high (~10 cm), and the weight and size of the device is limited to unobtrusive dimensions. As a consequence, the amount of power available from typical generating systems is limited to a few mW. Moreover, wearable electronics are becoming increasingly sophisticated and consuming more and more power.

Another limitation of known systems is that the known systems harvest power in only one dimension. By way of example, a moving piston within a generator positioned in the heel of a shoe can be used to generate power. Of course, any energy available from motion in other directions, such as pivoting motions, is lost.

Accordingly, there is a need for a lightweight generator that can be used to convert a movement into power. It would be beneficial if such a device were not limited to harvesting power available in a single dimension.

SUMMARY

A wearable generator system in one embodiment includes a plurality of coils, each of the plurality of coils extending within a respective one of a plurality of planes, a magnet for generating a magnetic field, and a support attached to a support anchor point and to the magnet, and suspending the magnet at a position whereat the magnet is not frictionally engaged with a fixed surface, the support having a length selected such that the magnetic field is movable across each of the plurality of coils.

In accordance with another embodiment, a wearable generator system includes at least one first coil, each of the at least one first coils extending within a respective one of at least one first plane, a first magnet for generating a first magnetic field, and a first support having a first portion fixedly positioned with respect to the at least one first coil and a second portion spaced apart from the first portion, the second portion fixedly attached to the first magnet at a location lower than the first portion.

BRIEF DESCRIPTION OF THE DRAWINGS

FIG. 3 depicts a perspective view of a power harvester that is located in one of the generator pouches of FIG. 1;

FIG. 4 depicts the power harvester of FIG. 3 after the wearer of the wearable generator system has moved from a first position;

FIG. 5 depicts the power harvester of FIG. 3 after the wearer of the wearable generator system has stopped moving;

DESCRIPTION

Figure 1:
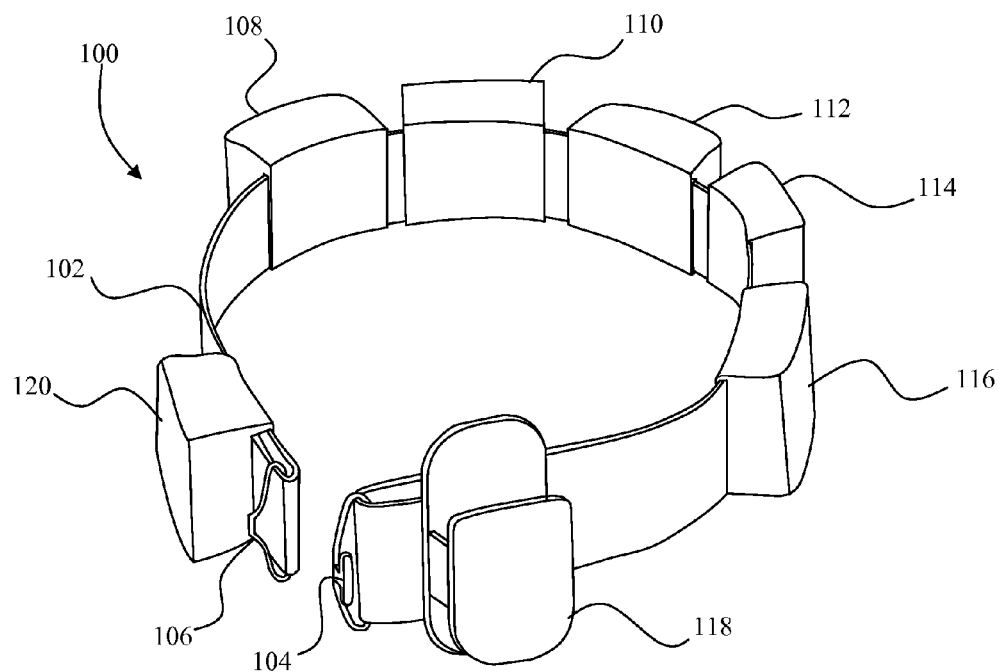
FIG. 1 depicts a perspective view of a wearable generator system including a plurality of generator pouches, an energy storage pouch and a charging holster in accordance with principles of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Referring to FIG. 1, there is depicted a representation of a wearable generator system generally designated 100. The generator system 100 in this embodiment includes a belt 102 that can be fastened about a wearer using male clasp 104 and female clasp 106. Supported on the belt 102 are plurality of generator pouches 108, 110, 112, and 114, an energy storage pouch 116, a charging holster 118, and an auxiliary pouch 120.

Figure 2:
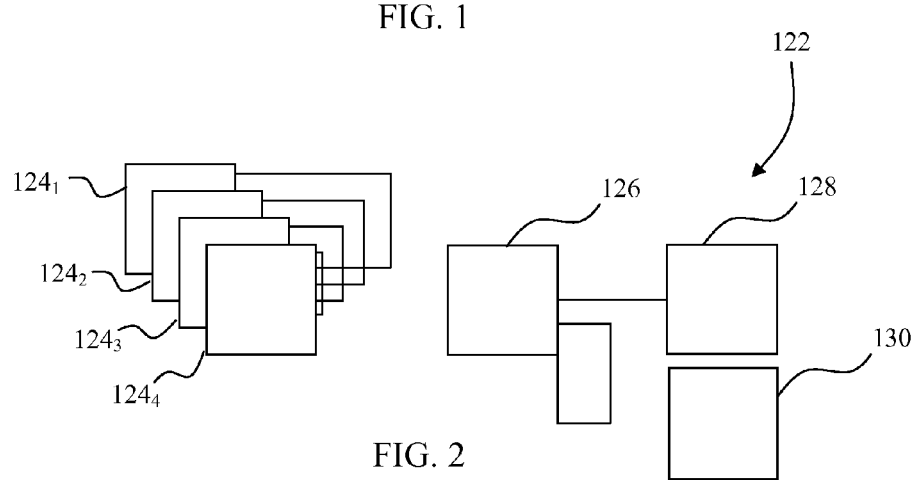
FIG. 2 depicts a schematic diagram of the electrical circuit of the wearable generator system of FIG. 1.

The generator pouches 108/110/112/114 house a respective one of the power harvesters $124_{1-4}$ shown in FIG. 2. The power harvesters $124_{1-4}$ generate electrical power which is directed to a conditioning and charging circuit 126 which is housed within the energy storage pouch 116. The conditioning and charging circuit 126 includes one or more energy storage devices along with conditioning and control electronics.

The conditioning and charging circuit 126 includes a processing circuit and a memory. The processing circuit may suitably be a general purpose computer processing circuit such as a microprocessor and its associated circuitry. The processing circuit is operable to carry out the operations attributed to it herein. Within the memory are program instructions. The program instructions are executable by the processing circuit and/or any other components as appropriate.

The conditioning and charging circuit 126 control the components therein for conditioning energy received from the power harvesters $124_{1-4}$ and using the conditioned energy to charge the energy storage devices. The conditioning and charging circuit 126 further direct energy from the energy storage devices or from the power harvesters $124_{1-4}$ to a charging component 128 located in the charging holster 118. The charging component 128 may include contacts for directly charging an electrical component placed into the charging holster 118 or coils for inductively charging an electrical component. In alternative embodiments, an electrical component such as a sensor or communications component may be hardwired into the charge control system 122.

The conditioning and charging circuit 126 may also direct energy from the energy storage devices or from the power harvesters $124_{1-4}$ to a charging component 130 located in the auxiliary pouch 120. The auxiliary pouch 120 may thus be used to charge replaceable batteries used in portable electronics.

Each of the power harvesters $124_{1-4}$ in this embodiment are identical and are described in more detail with reference to the power harvester $124_1$ shown in simplified form in FIG. 3. The power harvester $124_1$ includes a number of coils $132_x$. Each of the coils $132_x$ includes one or more turns of electrically conductive material and is electrically isolated from the other of the coils $132_x$. A support line 138 (seen more clearly in FIG. 4) is attached at one end to a support anchor point 140 and at another end to a magnet 142.

The magnet 142 is supported by the support line 138 in a manner which allows for movement of the magnet 142 within the space defined by the coils $132_x$. For example, as a wearer accelerates in the direction of the arrow 144 of FIG. 3, the inertia of the magnet 142 causes the magnet 142 to be displaced from the location of FIG. 3 to the location of FIG. 4. Such movement may be effected by using a rigid material for the support line 138 but allowing the support line 138 to swivel about the support anchor point 140. Alternatively, a non-rigid material or even a resiliently stretchable material may be used to construct all or a portion of the support line 138. In one embodiment, the support line 138 thus further allows for rotation of the magnet 142 such as in the direction of the arrow 146 of FIG. 5.

Figure 6:
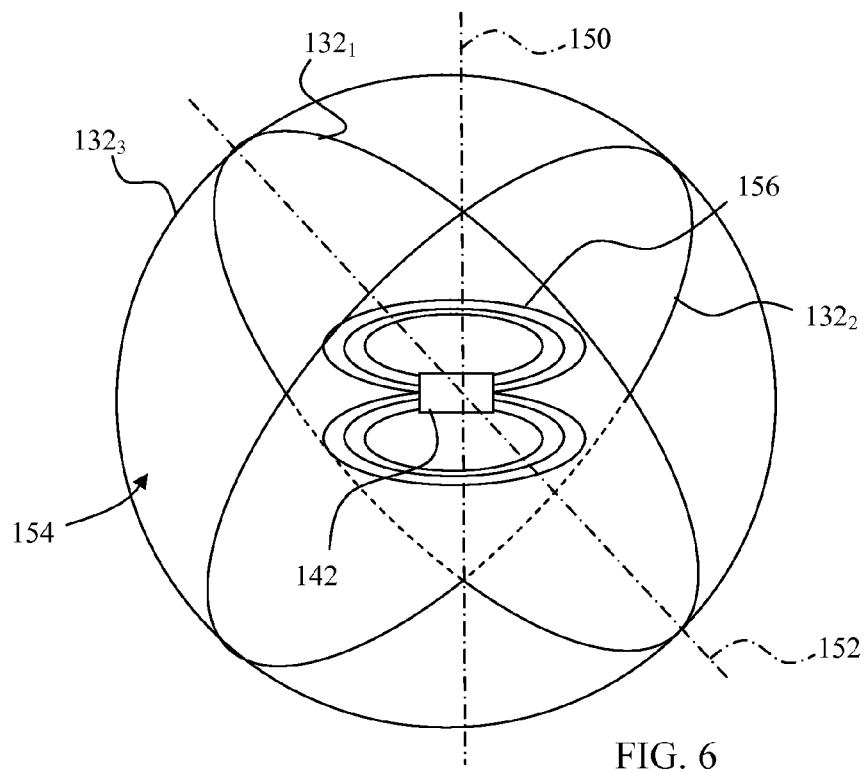
FIG. 6 depicts a simplified perspective view of the power harvester of FIG. 3 showing the magnet field of the magnet of the power harvester with the magnet centrally located within a coil volume defined by the power harvester coils.
Figure 7:
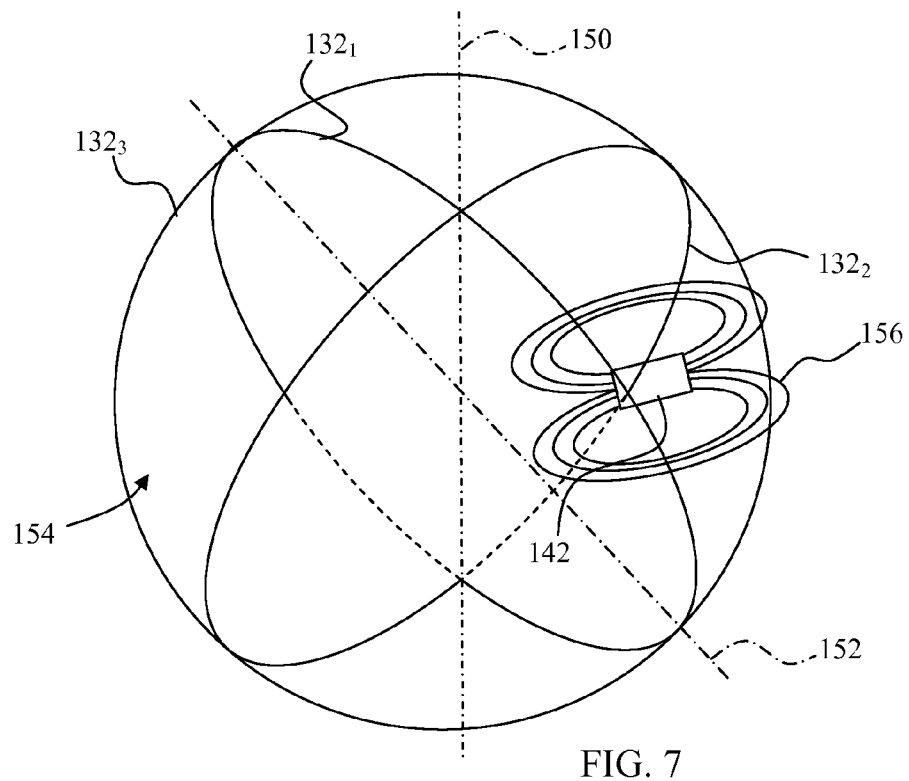
FIG. 7 depicts a simplified perspective view of the power harvester of FIG. 3 showing the magnet field of the magnet of the power harvester intersecting two different coils.

The movement of the magnet 142 with respect to the coils $132_x$ generates electricity as discussed with further reference to FIGS. 6 and 7. FIG. 6 depicts a simplified view of the power harvester $124_1$ showing only coils $132_{1-3}$. The coils $132_{1-3}$ are each substantially positioned within a respective plane, each of the planes intersecting the planes in which the other of the coils $132_{1-3}$ are positioned. By way of example, the planes in which the coils $132_2$ and coils $132_3$ lie intersect along the line 150 while the planes in which the coils $132_1$ and coils $132_3$ lie intersect along the line 152. The coils $132_{1-3}$ thus define a coil volume generally identified as 154 which is substantially in the form of a sphere. The magnet 142 is suspended within the coil volume 154 and the magnetic field 156 of the magnet 142 emanates from the magnet 142.

As the magnet 142 moves, such as from the position depicted in FIG. 6 to the position depicted in FIG. 7, the magnetic field 156 moves across various of the coils $132_{1-3}$. As depicted in FIG. 7, the magnetic field 156 has crossed the coil $132_2$ and the coil $132_3$. As the magnetic field 156 crosses the coils $132_{2-3}$, a current is generated in the coils $132_{2-3}$ which is transferred to energy storage devices within the conditioning and charging circuit 126. The conditioning and charging circuit 126 then boosts the voltage generated by the harvester to the one usable by a sensor, personal electronic device, or a battery or a capacitor as appropriate.

More specifically, electromagnetic power harvesting uses the voltage induced in a conductive coil moving relative to a permanent magnet. Using Faraday's law, the voltage induced in a generator where a coil moves through a permanent magnetic field ($V_{EMF}$) can be expressed by:

$$V_{EMF} = -\frac{d\Phi}{dt} = -\frac{d}{dt}(Nlz(t)B(t))$$

where N is the number of turns of the coil, B is the strength of the magnetic field, $\Phi$ is the magnetic flux, and/is the length of a side of one loop in the coil. The generated output power is given in general by $P=V_{EMF}^2/R_{tot}$.

Thus, each of the coils $132_{2-3}$ generates electrical power. As is evident from FIGS. 6 and 7, the coils $132_{2-3}$ are orientated differently. Accordingly, even if the movement of the magnet 142 is such that power generation is maximized for the coil $132_2$, the coil $132_3$ still generates some amount of power. Given the multiple orientations of the coils $132_x$ as depicted in FIG. 3, any movement of the magnet 142 will generate some power in at least one of the coils $132_x$. The wearable generator system 100 is thus capable of generating power for a wide variety of movements. Consequently, the wearable generator system 100 may be positioned about an individual's waist, on an arm or a leg, etc. and still provide energy.

Because the wearable generator system 100 is able to generate power without limitation as to the particular movement exhibited by the magnet 142, power generation is maximized, in general, by maximizing movement of the magnet 142. To this end, the support line 138 may be a flexible line such that kinetic energy of the magnet 142 is not lost through frictional contact.

The support anchor point 140 is positioned such that when the belt 102 is positioned on a wearer, the support anchor point 140 is at the upper portion of the power harvester 124₁. In embodiments wherein the orientation of the power harvester 124₁ is not controlled, or wherein the power harvester 124₁ is subject to large accelerations or inversion, an additional line or lines may be used to maintain the magnet 142 suspended within the coil volume 156. In embodiments wherein additional lines are used to keep the magnet 142 suspended at different orientations of the power harvesters 124ₓ, some amount of slack in the lines is preferably provided. Accordingly, movement of the magnet is generally limited by a single one of the lines to maximize movement of the magnet 142.

Figure 8:
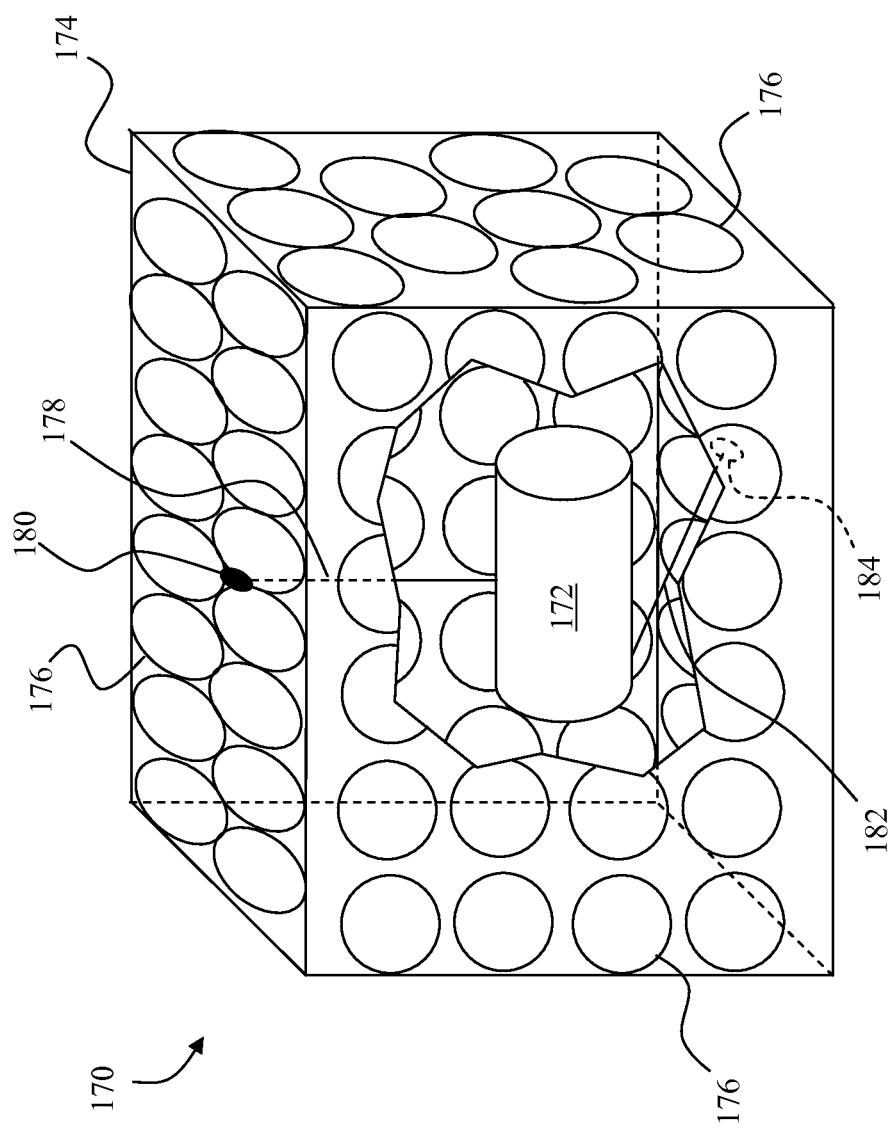
FIG. 8 depicts a partial cutaway perspective view of an alternative power harvester with a cube-shaped coil volume.

Movement of a magnet positioned within a coil volume may further be adjusted by connecting lines to the magnet asymmetrically. By way of example, FIG. 8 depicts an embodiment of a power harvester 170 with an asymmetrically suspended magnet 172. The power harvester 170 includes a rectangular frame 174 with coils 176 positioned on all six sides of the frame 174. The coils 176 thus define a rectangular coil volume in which the magnet 172 is suspended by a support line 178 attached to a support line anchor 180 on the frame 174. A tether line 182 is attached to a tether anchor point 184 on the frame 174 and to the magnet 172. Coil volumes of other shapes may be used for different applications. Additionally, while coils 176 are positioned on all sides of the frame 174, some embodiments may utile coils on less than all of the sides.

While the magnet 172 is supported at substantially the midpoint of the magnet 142 by the support line 178, the tether 182 is attached to the magnet 172 closer to one end of the magnet 172. Accordingly, as the magnet 172 moves to the left, the tether 182 will cause the magnet 172 to spin because the magnet 172 is asymmetrically supported by the support line 178 and the tether line 180. Axial movement of the magnet 172 is thus converted to a spinning motion which causes a magnetic field of the magnet 172 to cross several of the coils 176. Thus, contact between the magnet 172 and the frame 174 and coils 176 can be reduced, thereby reducing frictional loss, while increasing the crossing of coils 176 by the magnetic field of the magnet 172.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

The invention claimed is:

1. A wearable generator system comprising:
   a belt sized to be worn on the body of a person;
   at least one generator element mounted on said belt, said generator element including;
   a plurality of coils, each of the plurality of coils extending within a respective one of a plurality of non-coplanar planes, said coils defining a three-dimensional volume;
   a magnet for generating a magnetic field; and
   a support attached to a support anchor point attached to said plurality of coils, and to the magnet, and suspending the magnet at a position whereat the magnet is not frictionally engaged with a fixed surface, the support having a length selected such that the magnetic field is movable within the three-dimensional volume across each of the plurality of coils to generate electrical power by movement in three dimensions.

2. The system of claim 1, further comprising:
   a tether anchor point located below the height of the support anchor point; and
   a tether attached to the magnet and to the tether anchor point.

3. The system of claim 2, wherein at least one of the support and the tether is resiliently stretchable.

4. The system of claim 1, wherein:
   the plurality of coils comprises a first group of at least two coils and a second group of at least two coils;
   each of the coils in the first group of coils extends within a first plane;
   each of the coils in the second group of coils extends within a second plane; and
   the first plane intersects the second plane.

5. The system of claim 4, wherein:
   the plurality of coils comprises a third group of at least two coils;
   each of the coils in the third group of coils extends within a third plane; and
   the third plane intersects the first plane and the second plane.

6. The system of claim 4, wherein:
   the plurality of coils comprises a third group of at least two coils and a fourth group of at least two coils;
   each of the coils in the third group of coils extends within a third plane;
   each of the coils in the fourth group of coils extends within a fourth plane; and
   the third plane intersects the first plane and the fourth plane.

7. The system of claim 1, wherein said generator element includes a charging and conditioning circuit electrically connected to said plurality of coils to condition electricity generated in said coils by movement of said magnetic field across said the coils.

8. The system of claim 7, wherein said at least one generator element includes an electrical energy storage device electrically connected to said charging and conditioning circuit.

9. The system of claim 1, wherein said at least one generator element includes a plurality of generator elements mounted at spaced apart locations on said belt.

\* \* \* \* \*